United States Patent Office 3,459,224
Patented Aug. 5, 1969

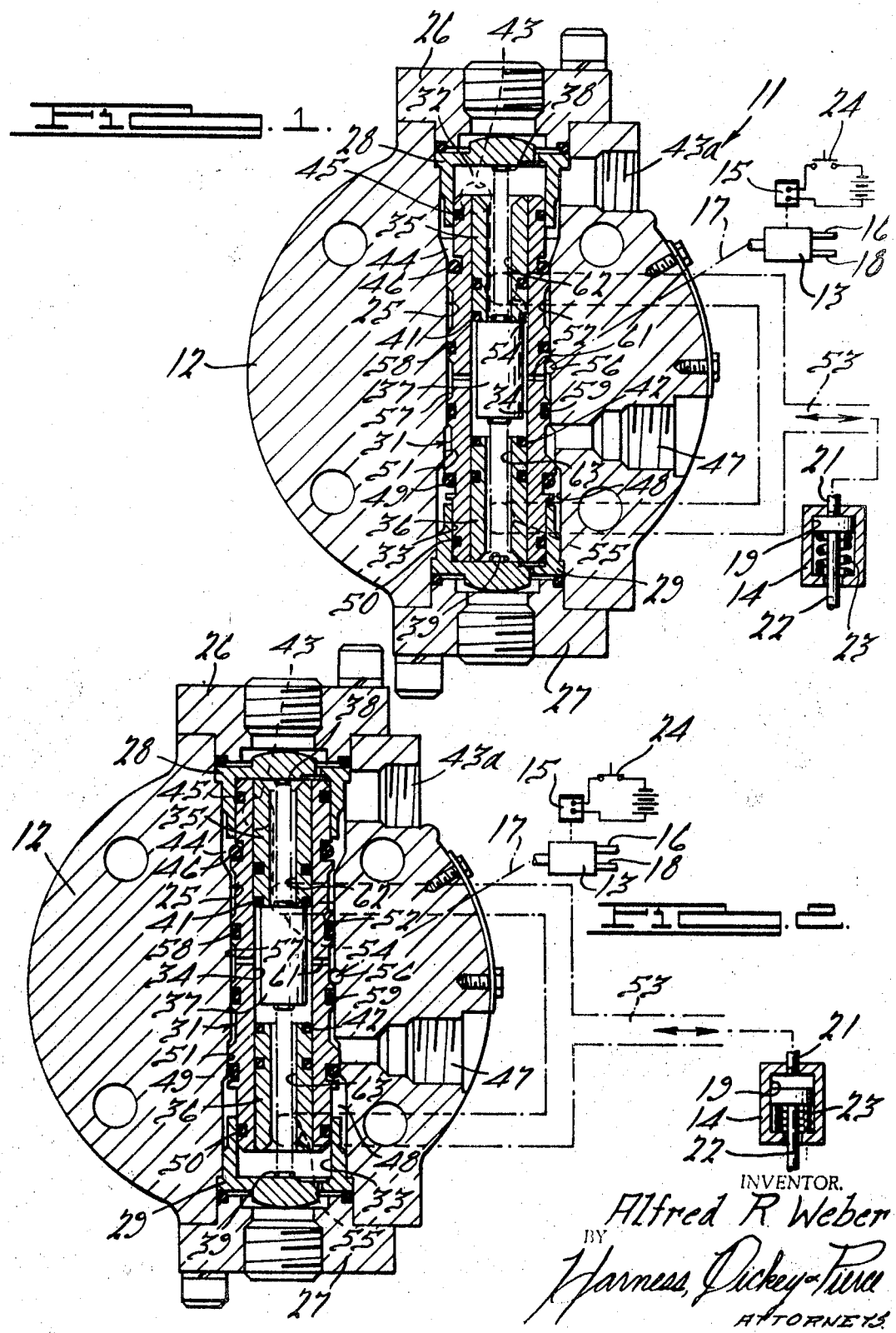

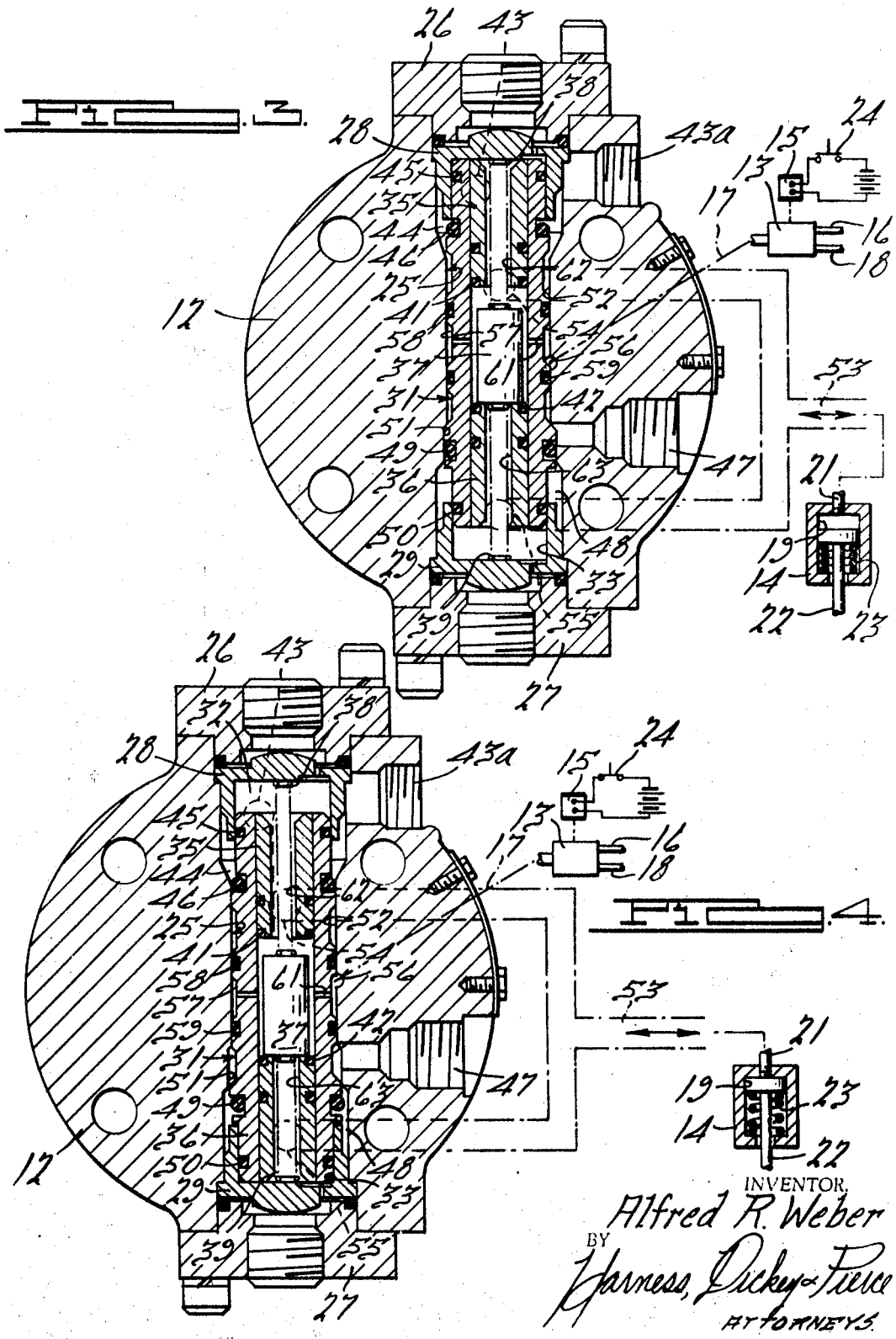

3,459,224
INDEXING FLUID CONTROL DEVICE
Alfred R. Weber, Livonia, Mich., assignor to Ross Operating Valve Company, Detroit, Mich., a corporation of Michigan
Filed Oct. 20, 1967, Ser. No. 676,837
Int. Cl. F16k *11/02, 11/10*
U.S. Cl. 137—625.63                9 Claims

ABSTRACT OF THE DISCLOSURE

A fluid control device shiftable between two alternate positions in response to successive momentary applications of fluid pressure. Seal area differentials on a spool hold it in either extreme position without a mechanical locking mechanism, and are so arranged as to counteract each shifting force until the shifting movement begins, after which the counteracting force is released.

BACKGROUND OF THE INVENTION

Field of the invention

The invention relates to fluid control devices, and more particularly to mechanisms shiftable between two alternate positions in response to momentary applications of fluid pressure.

Description of the prior art

The prior art is exemplified by Patent No. 3,011,519 issued Dec. 5, 1961, to Brinkel et al. for Fluid Control Device. In this prior art construction, air is alternately supplied to chambers at opposite ends of a spool valve within which a ball valve is located. In order for this device to operate properly, the fluid, particularly compressed air, must be supplied rapidly enough to quickly fill up the expanding volume of the chamber being pressurized. If such air supply is too slow, the necessary pressure differential across the ball valve will not be maintained after partial movement of the spool, and the ball valve could leave its seat. This might therefore result in air being supplied at the opposite end of the spool, so that the spool could not complete its shifting movement.

In order to assure proper actuation on this prior art device, a mechanical latch is provided which positively locks the spool in each of its alternate positions.

SUMMARY OF THE INVENTION

According to the present invention, the mechanical locking mechanism is dispensed with and instead a novel arrangement of seal area differentials is provided on the spool which results in positive movement of the spool during its shift. More particularly, the seal area differentials are so arranged that during the first part of each spool stroke, movement will be opposed by pressure at the opposite end, but after travel is started, the opposing force will be removed. The possibility of spool hang-up in mid-position will thus be reduced.

BRIEF DESCRIPTION OF THE DRAWINGS

FIGURE 1 is a cross sectional and partially schematic view of the invention showing the spool in one position with both the output and signal ports exhausted.

FIGURE 2 is a view similar to FIGURE 1 but with the signal and output ports pressurized.

FIGURE 3 is a view similar to FIGURE 2 but showing the signal port exhausted, and FIGURE 4 is a view similar to FIGURE 3, but showing the spool shifted back to its first position, the signal port being pressurized and the output port exhausted.

DESCRIPTION OF THE PREFERRED EMBODIMENT

The adaptor is generally indicated at 11 and comprises a body 12 which is flat on both sides and is of generally circular shape, so as to be mountable in an assembly, such as between a solenoid-operated pilot valve 13 and a fluid-operated motor 14. These are shown schematically in FIGURE 1, valve 13 being controlable by a solenoid 15 which when energized, for example, will supply fluid pressure from a supply port 16 to a signal line 17. When solenoid 15 is deenergized, signal line 17 will be connected to an exhaust port 18. Motor 14 has a chamber 19 supplied by a port 21 so as to actuate a piston rod 22 which may, for example, operate a main valve.

The object of the fluid control device is to alternately pressurize and exhaust motor chamber 19 upon successive pulsations in the signal line 17. For example, starting from an initial condition in which signal line 17 is exhausted and chamber 19 is also exhausted, piston rod 22 will be lifted by a spring 23. A signal pulse applied to line 17, for example, by closure of a switch 24 in the circuit of solenoid 15, will cause pressurization of chamber 19 and downward movement of the piston rod. Removal of the pressure signal pulse from line 17, by opening of switch 24, will still leave chamber 19 pressurized and piston rod 22 depressed. This release of the signal pulse may occur immediately after its application, since the closure of switch 24 may be momentary. However, the next closure of switch 24 and application of pressure in signal line 17 will result in exhaustion of chamber 19 and retraction of piston rod 22. The next exhaustion of signal line 17 will leave chamber 19 exhausted and piston rod 22 lifted. The cycle would then be repeated.

Body 12 has a bore generally indicated at 25 which is closed at its opposite ends by covers 26 and 27. A pair of cup-shaped members 28 and 29 are secured within bore 25 by covers 26 and 27 respectively. A spool generally indicated at 31 is slidably disposed within bore 25 and within chambers 32 and 33 formed by members 28 and 29 respectively. This spool has a bore 34 within which is secured a pair of hollow cylindrical inserts 35 and 36. The inserts are spaced from each other and are flush with the ends of the spool. A shuttle valve 37 is disposed in the space between the inserts, this shuttle being cylindrical in shape and shorter than the distance between the inserts. A pair of similar helical coil compression springs 38 and 39 of equal unstressed length are disposed within inserts 35 and 36 respectively, one end of each spring engaging the shuttle and the other end a member 28 or 29. The shuttle is movable between a first position (FIGURE 1) engaging a seal 41 on insert 35 in a second position (FIGURE 3) engaging a seal 42 on insert 36.

A supply port 43 in body 12 is connected with a chamber 44 adjacet member 28 and which forms an enlargement of bore 25. Reference numeral 43 indicates an internal supply port, while an alternately usable external supply port is indicated at 43a. Spool 31 has a seal 45 slidable within chamber 32 and another seal 46 of larger diameter slidable within bore 25 when the spool is in the position of FIGURE 1 or 4. In the position of FIGURES 2 and 3 seal 46 is within the enlarged chamber 44. However, in the FIGURE 1 or FIGURE 4 position, the pressure from supply port 43 will act in opposite directions against seals 45 and 46, and since the latter has a larger diameter there will be a force differential tending to urge pool 31 downwardly in the figures.

An exhaust port 47 is also provided in body 12, this port being connected with a chamber 48 formed in bore 25 adjacent member 29 when spool 31 is in the position of FIGURES 1 or 4. Spool 31 carries a seal 49 which, in the position of FIGURE 2 or 3, engages a land 51 of bore 25 having a larger diameter than that which engages seal 46. Seal 49, when in this position, will separate chamber 48 from exhaust port 47. However, at this time, supply chamber 44 will be connected with the narrower portion of bore 25 from which seal 46 has been withdrawn. This narrower portion is indicated at 52 in FIGURE 2.

A seal 50 is carried by the end of spool 31 within chamber 33. The area of this seal is equal to that of seal 45 but is greater than the area differential between seals 45 and 46, for purposes which will hereafter appear.

An output connection 53 of adaptor 11 is connected to port 21 of motor 14, this output connection having two ports indicated at 54 and 55 in FIGURE 2. Port 54 is connected with bore portion 52 while port 55 is connected with chamber 48. It will thus be seen that, for example, in the FIGURE 1 position port 55 will be connected to exhaust port 47 while in the FIGURE 2 position port 54 will be connected with supply port 43. Therefore, when moving to the FIGURE 2 position, adaptor 11 will change motor chamber 19 from an exhaust condition to a supply condition.

Signal line 17 is connected to a signal port 56 in bore portion 52 adjacent a reduced portion 57 of spool 31. This reduced section is bounded by a pair of seals 58 and 59, and radial passages 61 (FIGURE 2) are formed in the spool and connect the signal port 56 with bore 34 adjacent shuttle 37.

It should be noted that the area of seal 49 is greater than the area of seal 58 or 59. When the spool is in the FIGURE 3 position, as will later be described in detail, supply pressure will be acting on the area of seal 49 urging it upwardly and on the area of seal 58 urging it downwardly so that the force differential will retain the spool in the FIGURE 3 position. The area of seal 45 however is greater than the difference between the area of seals 49 and 58; therefore, pressurization of chamber 32 will move the spool downwardlly to the FIGURE 4 position.

The operation of the invention will now be described. Assuming an initial position of the parts as shown in FIGURE 1, chamber 32, which is not being supplied at this time, will be exhausted via bore 62 of member 35 and passages 61 leading to signal port 56. Spring 39 has insufficient force to maintain shuttle 37 against seal 41 against the pressure in chamber 32.

Output connection 53 will be exhausted through port 55, chamber 48 and exhaust port 47. The spool will be held or "latched" in the position shown by a force equal to the area differential of seals 46 and 45 times the fluid pressure. These are the only two seals which will be active in the position shown in FIGURE 1.

FIGURE 2 shows the position of the parts after signal port 56 has been pressurized. Shuttle 37 will be forced against seal 41 to close off the passage leading to chamber 32. Chamber 33 will be pressurized via passages 61 and 63, the latter being within member 36. The spool will move to the upward position, since the area of seal 50 is greater than the area of seal 46 less the area of seal 45. During the first portion of this upward movement the force created by the differential areas between seals 46 and 45 will tend to oppose spool movement, that is, it will tend to counteract the shifting force. Therefore, the latter must build up to a substantial level before movement begins. Once the movement does begin, seal 46 will be withdrawn from bore 52, thereby releasing the latching force and, in effect, assisting movement during the last portion of spool travel.

Movement to the FIGURE 2 position will cause output connection 53 to be pressurized, since supply pressure from chamber 44 will flow through bore 52 into output port 54.

When signal port 56 is exhausted, the parts will assume the FIGURE 3 position. Spool 31 will remain in its upward position but shuttle 37 will shift away from seal 41 and against seal 42, as urged by spring 38 which is compressed more than spring 39. This is because chamber 33 will be exhausted via passages 63 and 61 to the signal port. Spring 38 is of insufficient force to maintain the pressure in chamber 33.

Output connection 53 will remain pressurized due to the connection between supply port 43 and output port 54 described above. The spool will be held or "latched" in the position shown in FIGURE 3 by a force equal to the differential area between seals 49 and 58 times the supply pressure. This will come about as follows: Chamber 48 will have supply pressure obtained from output connection 53 and port 55. This will urge spool 31 upwardly. Smaller seal 58 will be exposed to supply pressure from the top, urging the spool downwardly but with a lesser force. The supply pressure acting on seal 45 in an upward direction will be counterbalanced by the pressure acting on seal 50 in a downward direction, since these two seals are of identical area.

Upon the next pressurization of signal port 56, chamber 32 will be pressurized via passages 61 and 62. Spool 31 will be moved to its downward position since the area of seal 45 is greater than the area of seal 49 minus the area of seal 58. As before, there will be an initial force counteracting the shifting force so that the pressure in chamber 32 must build up to a substantial level before movement begins. However, once it does begin, seal 49 will become separated from land 51 and chamber 48 will be connected to exhaust port 47. This will remove the latching or restraining force and as seal 46 engages bore portion 52 the new latching force will take effect.

The movement to the FIGURE 4 position will also exhaust output connection 53 past seal 49. Shuttle 37 will remain in its downward position against seal 56 so that the fluid pressurizing chamber 32 cannot escape.

Removal of signal port pressure will cause the parts to shift from the FIGURE 4 to the FIGURE 1 position. That is, spool 31 will remain in its downward position, exhausting output connection 53, but the removal of pressure against shuttle 33 will permit spring 39 to move the shuttle to its upper position as shown in FIGURE 1. The parts will then be ready for a repetition of the cycle.

What is claimed is:

1. In combination, an actuating spool shiftable between first and second positions, first and second chambers pressurizable to shift said spool respectively to said first and second positions, a central chamber, means for alternatively pressurizing and exhausting said central chamber, passageway means connecting said central chamber with said first and said second chambers, valve means disposed in said passageway means and movable between a first position preventing fluid flow to said first chamber and a second position preventing fluid flow to said second chamber, means responsive to movement of said spool to said first and second positions for urging said valve means toward its first and second positions, respectively, a constantly pressurized supply port, a first pair of seals on said spool having different areas, opposite sides of said seals being connected to said supply port in response to movement of said actuating spool to its first position, whereby the differential force created by said different areas tends to hold said spool in said first position, and a second pair of seals on said spool having different areas, opposite sides of said last-mentioned seals being connected to said supply port in response to movement of said actuating spool to its second position, whereby the differential force created by said last-mentioned different areas tends to hold said spool in said second position.

2. The combination according to claim 1, the diameter of said first chamber being such that pressurizing thereof from said supply port will overcome the differential force created by said second pair of seals and initiate movement of said spool toward its first position, and means responsive to said initial movement for disconnecting said supply port from said second pair of seals and thereby remove the differential force created thereon, thus permitting relatively quick completion of the movement of said spool to said first position.

3. The combination according to claim 2, said first chamber having the smaller seal of said first pair of seals.

4. The combination according to claim 2, said last-mentioned means comprising a land engageable by the larger of said first pair of seals in response to said initial spool movement to separate the smaller of said second pair of seals from said supply port, an exhaust port, and a land engaged by the larger of said second pair of seals when the spool is in its second position but disengageable therefrom when the spool moves away from its second position, whereby the supply pressure on the larger of said second pair of seals will be relieved through said exhaust port.

5. The combination according to claim 1, the size of said second chamber being such that supply pressure therein will overcome the differential force created by said first pair of seals and initiate movement of said seal toward its second position, and means responsive to said initial movement for relieving the supply pressure on the larger of said first pair of seals, thereby permitting quick completion of spool movement to said second position.

6. The combination according to claim 5, said last-mentioned means comprising a land engageable by the larger of said first pair of seals when the spool is in said first position but disengageable therefrom in response to said initial movement away from the first position and an output port connected to said land whereby said last-mentioned initial movement will connect said supply port to said output port.

7. The combination according to claim 6, further provided with a land engageable by the larger of said second pair of seals when said spool is in its second position but disengageable therefrom when the spool is in its first position, an exhaust port connected to said land on one side of said last-mentioned seal, and a connection from said supply port to the other side of said last-mentioned seal, whereby movement of said spool toward its first position will connect said output port to said exhaust port.

8. The combination according to claim 1, further provided with a signal port connected to said central chamber, and means for alternately pressurizing and exhausting said signal port, whereby momentary pressurization of said signal port will create alternate shifting of said spool between its first and second positions.

9. The combination according to claim 8, further provided with an output port, and means responsive to movement of said spool toward its first position for pressurizing said output port and responsive to movement of said spool toward its second position for exhausting said output port.

References Cited

UNITED STATES PATENTS 3,011,519 12/1961 Brinkel et al. _____ 137—624.27
3,131,722 5/1964 Abbott et al. __ 137—625.66 XR HENRY T. KLINKSIEK, Primary Examiner U.S. Cl. X.R.
137—624